United States Patent [19]
Vismara

[11] Patent Number: 5,460,497
[45] Date of Patent: * Oct. 24, 1995

[54] MACHINE FOR MOULDING COMPOSITE PLASTIC MATERIAL

[75] Inventor: Mario Vismara, Casatenovo, Italy

[73] Assignee: Devi S.p.A., Besana Brianza, Italy

[*] Notice: The portion of the term of this patent subsequent to Apr. 19, 2011 has been disclaimed.

[21] Appl. No.: 155,157

[22] Filed: Dec. 20, 1993

Related U.S. Application Data

[62] Division of Ser. No. 991,256, Dec. 16, 1992, Pat. No. 5,284,608.

[30] Foreign Application Priority Data

Dec. 16, 1991 [IT] Italy .................. MI91A3358

[51] Int. Cl.⁶ .................. B29C 39/10; B29C 45/14
[52] U.S. Cl. .................. 425/4 R; 425/122; 425/553; 425/589; 425/388; 425/451; 425/454
[58] Field of Search .................. 425/117, 122, 425/215, 4 R, 817 R, 395, 388, 397, 407, 553, 556, 451.6, 453, 454, 126.1, 292, 403.1, 436 R, 436 RM, 554, 112, 168, 593, 589, 451; 156/500; 264/261

[56] References Cited

U.S. PATENT DOCUMENTS

| | | | |
|---|---|---|---|
| 2,802,766 | 8/1957 | Leverenz | 264/255 |
| 2,977,639 | 4/1961 | Barklluff, Jr. et al. | 264/45.4 |
| 3,309,439 | 3/1967 | Nonweiller | 264/45.4 |
| 3,391,823 | 7/1968 | Jijms | 264/255 |
| 3,405,026 | 10/1968 | Roberts | 264/255 |
| 3,414,456 | 12/1968 | Roberts | 264/255 |
| 3,419,455 | 12/1968 | Roberts | 264/255 |
| 3,420,729 | 1/1969 | Roberts | 264/255 |
| 3,455,483 | 7/1969 | Inkeaar | 264/45.4 |
| 4,405,537 | 9/1983 | Spengler | 264/45.4 |
| 4,464,329 | 8/1984 | Whiteside et al. | 264/544 |
| 4,994,224 | 2/1991 | Itoh et al. | 264/247 |
| 5,188,787 | 2/1993 | King et al. | 425/553 |
| 5,304,050 | 4/1994 | Vismera | 425/454 |

FOREIGN PATENT DOCUMENTS

| | | |
|---|---|---|
| 103377 | 7/1983 | European Pat. Off. . |
| 0512609 | 11/1992 | European Pat. Off. . |
| 2411670 | 9/1975 | Germany . |
| 2709450 | 5/1978 | Germany . |
| 3604175 | 8/1986 | Germany . |
| 3637660 | 5/1987 | Germany . |
| 56-99634 | 8/1981 | Japan . |
| 1447110 | 8/1976 | United Kingdom . |
| 2160148 | 12/1985 | United Kingdom . |

OTHER PUBLICATIONS

Patent Abstracts of Japan, vol. 4, No. 169 (M-43) (651), Nov. 1980.

*Primary Examiner*—Khanh P. Nguyen
*Attorney, Agent, or Firm*—Jacobson, Price, Holman & Stern

[57] ABSTRACT

In a machine for moulding of composite plastic material, in particular of foamed polystyrene coupled with rigid polystyrene sheet, the rigid material (2) is preformed at a performing station, with the preformed portion being simultaneously separated from the starting material, and the preformed shaped portion is transferred from the preforming station to a moulding station, in which the foamed material is moulded by sintering and pulsed steam action on the preformed rigid material. The resulting piece is brought back to the preforming station (1) and a further portion of rigid material (2) is preformed on the foamed material, and this portion is then thermoset inside the moulding mould (3) on the foamed material, thus generating an article with two opposite surfaces made of a rigid material, between which the foamed material is sandwiched.

6 Claims, 10 Drawing Sheets

MACHINE FOR MOULDING COMPOSITE PLASTIC MATERIAL

This is a divisional of application Ser. No. 07/991,256 filed Dec. 16, 1992, now U.S. Pat. No. 5,284,608.

BACKGROUND OF THE INVENTION

The present invention relates to a machine for moulding composite plastic material, in particular a plastic foamed material in combination with a rigid plastic material, such as, e.g., foamed polystyrene coupled with rigid polystyrene sheet.

The term "rigid" is meant in the instant disclosure in a relative meaning, i.e., in order to describe a material showing generally higher stiffness characteristics than of the plastic material rigid material is coupled with; consequently, by such a term, also a thin-sheet material understood.

In order to mould these materials, which require steam to be applied in order to cause the foamed plastic material to undergo sintering and simultaneously adhere to the rigid material, from Italian patent No. 1 185 507 the use is already known of a mould constituted by two half-moulds which define, between them, a moulding hollow suitable for containing both materials, one of which, i.e., the more rigid, material, in sheet form, is first preformed while only being into contact with the bottom half-mould, and the other material is then moulded atop the first one by means of a sintering step inside the closed mould.

According to this technique, the rigid, sheet-shaped plastic material is fastened at its extreme edges and is deformed while hot, initially due to the movement of the relevant half-mould beyond the plane on which the sheet material lays, and then the material is caused to exactly adhere to the half-mould, by creating a depressure between said half-mould and the material.

Subsequently, the upper half-mould is lowered and inside the resulting hollow, the foamed plastic material is moulded by applying steam in a pulsed way and alternating steam application steps and vacuum or depressure steps, in order to enable the foamed material to undergo sintering also in its regions adjacent to the more rigid material, and hence create an effective adhesion of both materials to each other.

The method and equipment known from the prior art show the advantage that the moulding process can be carried out by means of one single mould consisting of two half-moulds which are mobile relatively to each other, hence they are advantageous from the constructive view point.

Unfortunately, they are unsuitable if one wishes to produce a composite material consisting of a rigid sheet on both or more mutually opposite faces of the foamed plastic material.

On the other hand, the need is more and more felt of producing composite materials consisting of sheets of more rigid materials on their external faces, both because such a structure endows the resulting article of manufacture with a higher stiffness, and because the possibilities of use and the range of obtainable articles would be considerably extended.

In fact, the external surface made of such a material supplies the end manufactured article with characteristics of impermeability, hardness and impact strength, besides a more pleasant appearance and the possibility of being washed, a property which, on the contrary, foamed polystyrene, per se, does not display. For example, at present, in packaging sector, in which foamed polystyrene is widely used owing to its properties of lightness, insulation, moulding ability and low cost, the material must be mostly discarded after use, because it is damaged and cannot be used again, and this matter of fact causes obviuos disposal and pollution problems. On the contrary, the material with hardened, smooth and compact surfaces on its external faces, could be used again. In any case, many articles could be manufactured, which at present have to be produced with other materials and more expensive processes and machinery.

SUMMARY OF THE INVENTION

The technical problem which the present invention wants to address is precisely overcoming the drawbacks and limits shown by the processes and equipment known from the prior art, by providing a process and a machine for moulding composite plastic material, which make it possible articles of plastic material with surfaces made from a more rigid material on at least two mutually opposite faces to be produced according to simplified modalities and by means of simplified equipment.

Within the scope of this purpose, the present invention furthermore wishes to provide a process and machine which makes it possible scrapped rigid material to be recovered and subsequently recycled, thus getting rid of disposal and pollution problems.

In order to achieve this purpose, according to the present invention a process for moulding composite plastic material, in particular foamed plastic material in combination with rigid plastic material, is proposed, in which the rigid material is first preformed and the foamed plastic material is moulded onto the rigid material by means of steam applied according to pulsed steps, characterized in that the portion of rigid material to be preformed is separated from the rigid material used as the starting material during the preforming step, and that the preformed material is transferred to the moulding step inside the preforming half-mould, and after the moulding step said moulded material is brought back to the preforming station in which atop the moulded material a further portion of rigid plastic material is submitted to preforming, with said further portion of rigid plastic material being simultaneously separated from the rigid starting material, said further portion being subsequently coupled, while hot, with the foamed plastic material, with the scrap material resulting from the preforming steps being sent, at each preforming step, to the recovery station before the preforming half-mould is moved back to the preforming station.

In order to practice the process according to the present invention, a machine for moulding composite plastic material is proposed, which machine comprises a preforming mould for preforming a rigid plastic material and a moulding mould for moulding a foamed plastic material, feed means for feeding the rigid plastic material to the preforming mould and feed means for feeding the foamed plastic material to the moulding mould, as well as means for applying steam, by means of pulsed application steps, to said moulding mould, characterized in that with said preforming mould means are associated for separating the portion of material to be preformed, which separating means operate simultaneously with the preforming mould, and that both moulds share one single half-mould alternatively mobile between the preforming station and the moulding station, with the feed means for feeding the rigid plastic material being actuatable during the step of moulding or the step of movement of said half-mould.

By means of a process and a machine according to the present invention, a perfect preforming is initially obtained of a first rigid material, by generating a depressure inside the preforming half-mould, and the structure is simplified as compared to a machine equipped with separate preforming and moulding moulds, because according to the present invention one single half-mould is provided, which travels from the preforming station where the first portion of rigid material is preformed, to the moulding station, and then returns back to the subsequent preforming step and to the thermosetting of the other portion of rigid material, and only this half-mould has to be moved.

Inasmuch as this half-mould is moved towards the moulding mould with the only preformed material portion, which hence is separated from the feed material, the scrap can be advantageously brought to the recovery station without said scrap undergoing any pollution by the lubricants, mould release agents, foam beads or other substances, said scrap material being consequently recyclable. Furthermore, the operation of scrap separation after that the moulded piece has been discharged from the machine, is avoided. Because the moulded foamed material retains a certain elasticity, the application of the sheet of rigid material on the foamed material can be carried out by means of the same mould with which the rigid material had been preformed before the moulding of the foamed material is carried out, whereas the end coupling of the sheet of rigid material on said foamed material takes then place at high temperature inside the same mould inside which the foamed material had been first moulded. In that way, a simplified structure is obtained.

BRIEF DESCRIPTION OF DRAWINGS

Further details and advantages of the invention will be clearer from the following full disclosure of the same invention, made by referring to a preferred, non-exclusive embodiment, illustrated for exemplifying purposes in the accompanying drawings, in which.

DESCRIPTION OF PREFERRED EMBODIMENT

Figure 1:
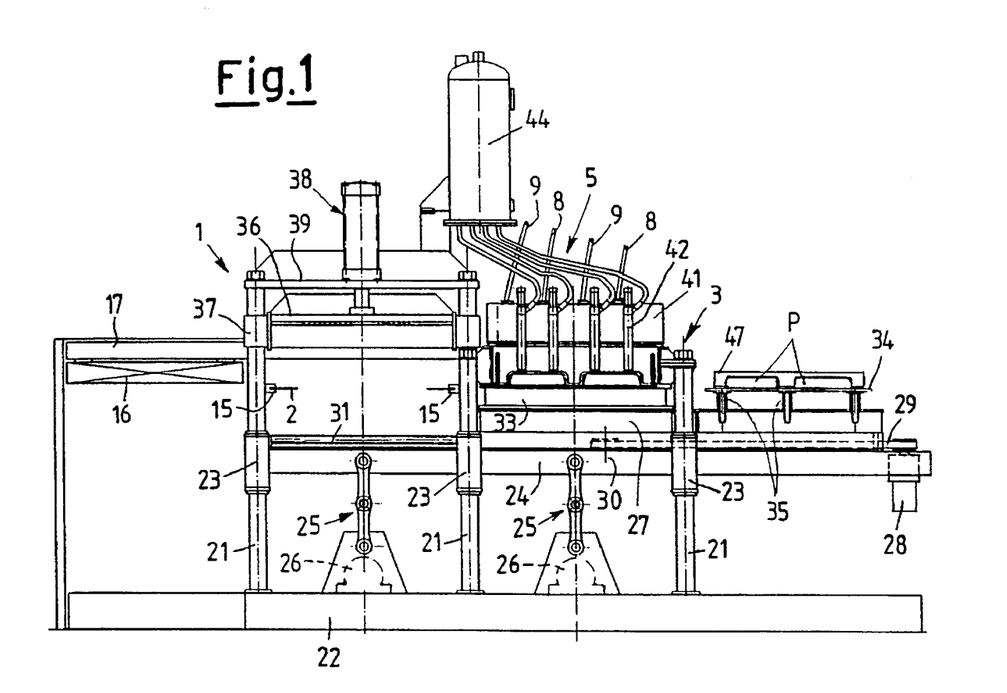
FIG. 1 shows a side elevation view of a machine according to the invention.
Figure 2:
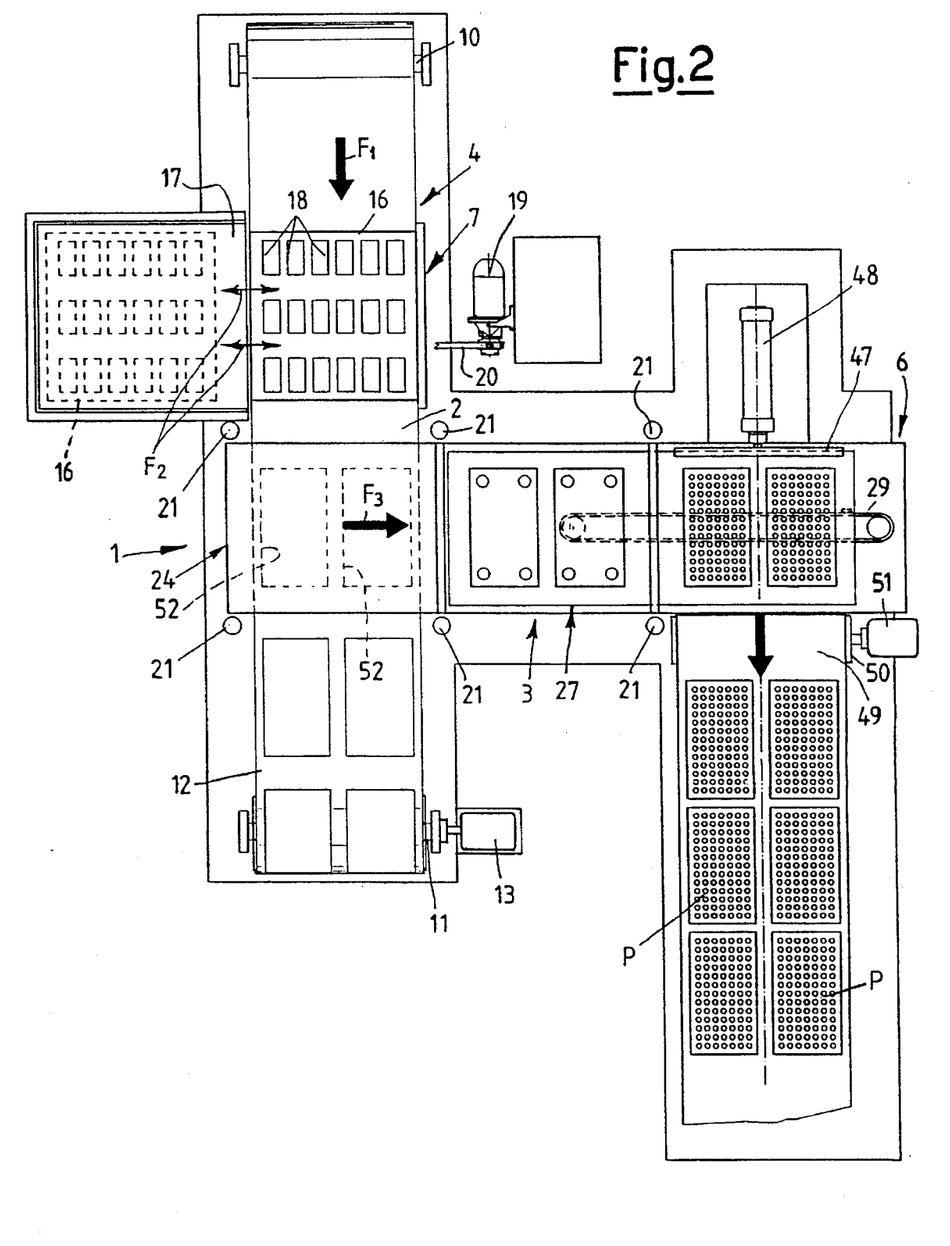
FIG. 2 shows a schematic plan view of the same machine, with some parts being omitted for the sake of simpicity.
Figure 3:
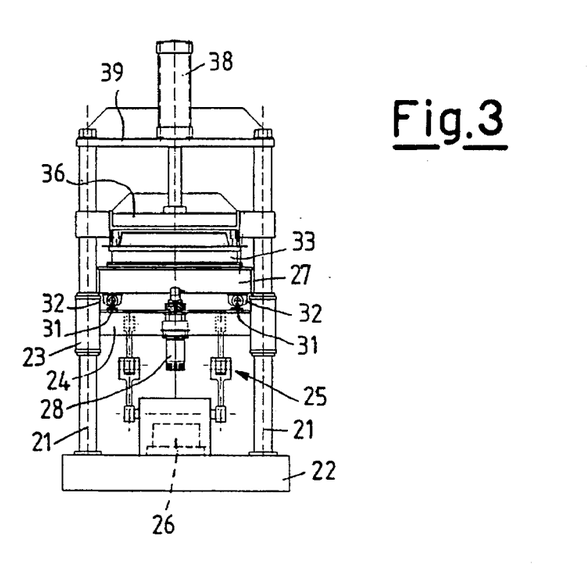
FIG. 3 shows a front view of a portion of the machine of the preceding Figures, limitedly to the only preforming mould.
Figure 4:
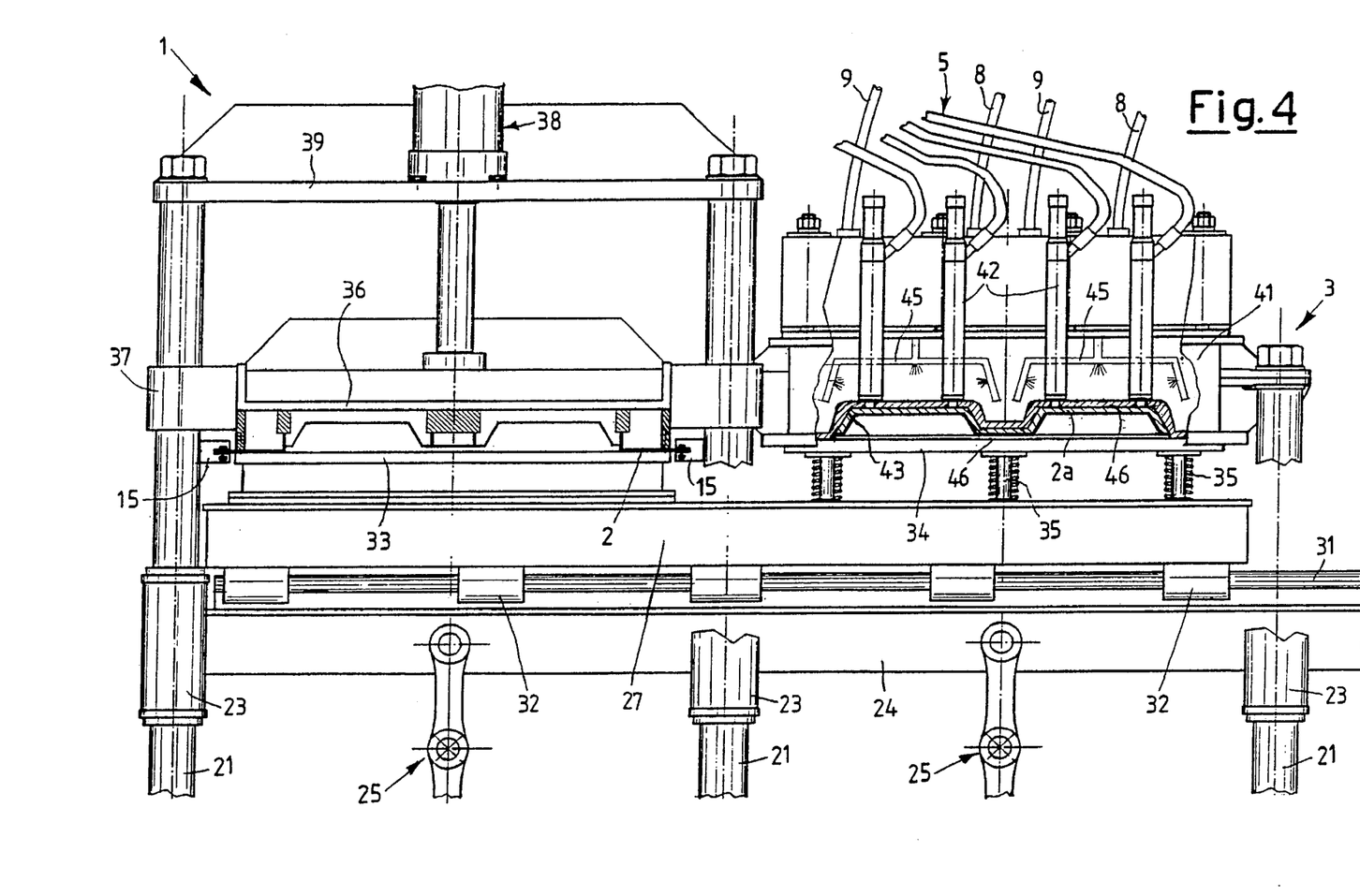
FIG. 4 shows a side elevation view on a larger scale of a portion of the machine, displaying the zone of the preforming and moulding mould.

Referring first to FIGS. 1–3, a machine for moulding composite material, as a foamed plastic material, in particular foamed polystyrene, in combination with a rigid plastic material, in particular a rigid polystyrene in sheet form, is substantially provided with a preforming station 1 in which the rigid plastic material 2 is preformed, a moulding station 3 at which the foamed plastic material is moulded atop the preformed material, a station 4 at which the rigid material 2 is fed to the preforming station 1 and feed means 5 for feeding the formed plastic material to the moulding station 3.

The machine is furthermore provided with a discharge station 6 if the rigid plastic and, material so requires, with pre-heating station 7, installed adjacent to the preforming station As regards the moulding station 3, this is also equipped with feed means 8 for feeding steam according to a pulsed fashion, in order to cause the foamed plastic material to undergo sintering according to a per se known technique, for example, as disclosed and illustrated in the above cited Italian patent 1 185 507, and with feed means 9 for feeding a coolant.

Figure 6:
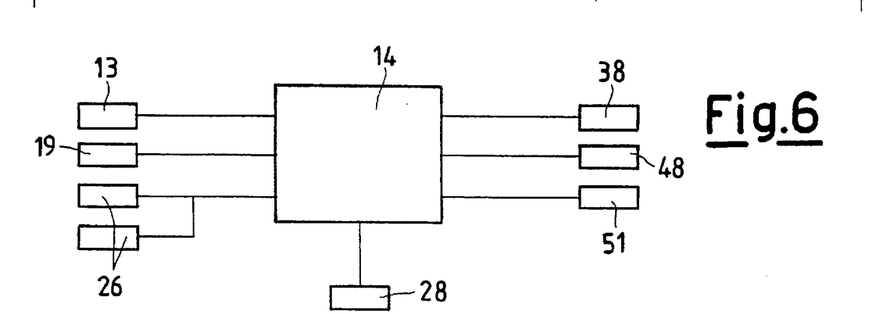
FIG. 6 is a block diagram of the centralized control section for the control of the required operations for moulding an article of composite plastic material.

The feed station 4 comprises feed means for feeding the rigid plastic material 2, which are essentially constituted by a roller 10 from which the material 2 is unwound and a roller 11 on which the scrap material 12 is wound, the roller 11 being caused to intermittently rotate by a motor mean 13 controlled by a central control unit schematically shown with 14 (see FIG. 6).

The material 2 is guided by guide means 15 at least at the preforming station 1, and is caused to advance according to the direction shown by arrow F1.

The preheating station 7 is preferably constituted by a preheater 16, in particular an infrared ray preheater, supported and guided crosswise (arrows F2 in FIG. 2) to the direction of movement of the continous material 2 by a guide body 17, between an operating position over the material 2 (which position is shown by solid lines in FIG. 2), and an offset rest position to the side thereof (the rest position is shown by dashed lines in FIG. 2). Of course, the number of heating elements 18 and/or the power thereof and/or the stay time of the preheater 16 over the material 2 will be selected as a function of the same material and of the preforming requirements. The movement of the preheater 16 is accomplished, for example, by means of a motor means 19 and a belt 20, which, at a point thereof, is made integral with said preheater and is returned around a stationary axle supported in position inside the structure 17. The motor means 19 is also controlled by the central control unit 14.

The preforming station 1 and the moulding station 3 substantially comprise a plurality of vertical uprights 21, fastened to a slab shaped base 22 and spaced apart from each other, along which relevant bushings 23 can slide, with which a horizontal support plane 24 is integral, which consequently can be lifted and lowered in a vertical direction, for example by means of toggle mechanisms generally indicated with 25, which receive their motion, as pairs, from respective motor means 26, also controlled by the central control unit 14.

On the support 24 there is provided a horizontally slidable slide 27, which can slide in the direction of arrow F3, i.e., substantially perpendicularly to the direction of feed F1 of the rigid material 2, in the exemplary embodiment illustrated herein, which slide 27 has a length substantially corresponding to the longitudinal horizontal dimension of both stations 1 and 3. The slide 27 is moved by a motor means 28, with the aid of a belt 29 made integral, at a point, with the slide 27 and returned around a fixed axle 30, said slide 27 being guided along longitudinal guides 31 fastened to the support 24 and slidingly engaged by respective runners 32 of the slide 27 between both rows of uprights 21.

On its left-hand side (FIG. 1), the slide 27 supports a preforming half-mould 33, and, on its right hand side, said slide bears a possibly sprung (i.e., by means of springs 35), support plane 34, designed to support the moulded articles P. The preforming half-mould 33 can cooperate, in the preforming station 1, with a counter-mould 36, which, in the exemplary embodiment illustrated herein is made vertically mobile by means of bushings 37 sliding along the uprights 21, but which could be a stationary one as well. The configuration of the mutually opposite hollows of the half-mould 33 and of the counter-mould 36 is such that in their preforming position, i.e., when the preforming mould is closed, they define a preforming hollow corresponding to the shape which has to be given to the end product P. The counter-mould 36 can be moved, for example by means of a hydraulic actuator consisting of a cylinder-ram unit 38, the cylinder of which is fastened to a crossbeam 39 of the preforming station 1, and whose ram is integral with the counter-mould 36. The actuation is controlled by the central control unit 14. The half-mould 33 can be provided with temperature regulation systems and with systems for applying a depressure to the hollow, through purposely provided passages.

Figure 5A:
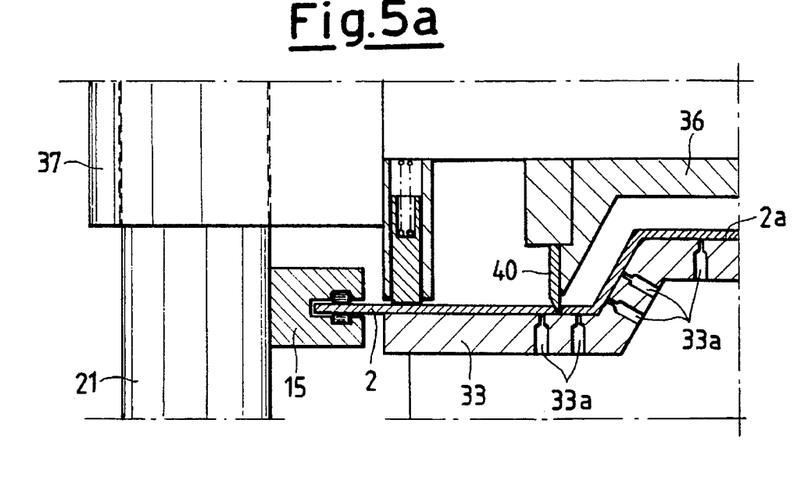
FIGS. 5a, 5b and 5c show views of an enlarged scale relatively to the preceding Figures, of a portion of the preforming mould in some operating steps.
Figure 5B:
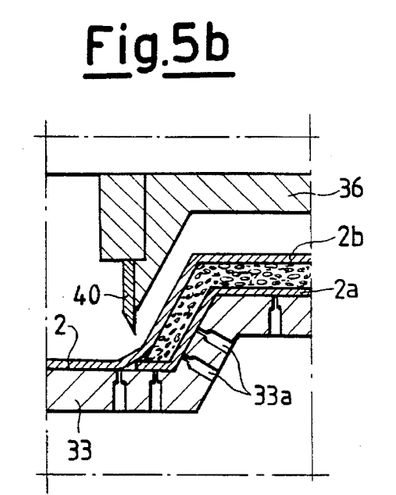
Figure 5C:
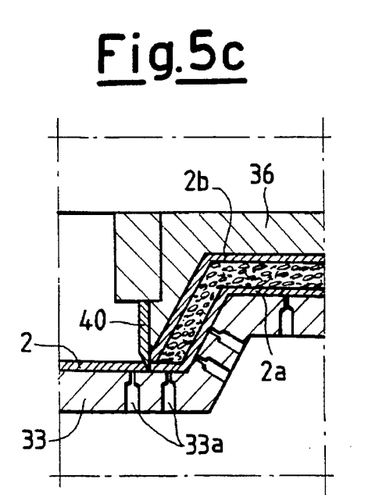

With the counter-mould 36 separation or shearing means are associated, which are better seen in FIGS. 5a, 5b, 5c, and are constituted by blades 40 so arranged as to separate from the rigid material 2 the portion to be preformed, by perimetrically shearing it at each preforming step, as is better seen in the following. In the half-mould 33 the channels 33a can be seen, which make it possible a depressure to be applied at the hollow of the half-mould 33, in a per se known way.

The moulding station 3 is constituted by a stationary or mobile half-mould 41, of a per se known type, for moulding foamed plastic materials by means of steam pulsed injections, for example as disclosed in Italian patent 1 185 507, already cited above. Consequently, in the drawing only some typical elements of such a mould have been generally indicated, such as the feed channels 42 for feeding the material 43, connected with a tank 44 inside which the material to be moulded is stored, the ducts 8 which supply steam, and the cooling ducts 9, which lead to spray nozzles 45. However, also condensate discharge means and means for generating a depressure inside the mould hollow are provided. With the reference numeral 46 the hollow is indicated which, in cooperation with the hollow defined in the preforming half-mould 33, defines the composite material moulding hollow. The same mould furthermore comprises knockouts which are per se known, and consequently are not illustrated in detail, in order to discharge the moulded articles P from the mould.

Alongside the moulding station 3 there is arranged the discharge station 6, which substantially comprises a pusher element 47, for example pneumatically actuated by a cylinder-ram unit 48, controlled by the central control unit 14, which causes it to move in a direction perpendicular to the direction of movement of the slide 27, and a conveyor belt 49, or another transport device.

The conveyor belt 49 has its upper stretch at the same level as of the support plane 34 (in the lifted position of the slide 27), on which also the pusher 47 operates, so the conveyor belt 49 receives the moulded pieces P from such a plane 34, and conveys them to a collection device, not depicted in the figures, according to a parallel direction to the feed direction of material 2. The conveyor belt 49 travels around a roller 50 and is intermittently actuated by motor means 51, together with the pusher element 47.

As schematically illustrated in FIG. 6 all the actuator organs which cause the movements of the several mobile elements of the machine which have been previously disclosed, are controlled by a central control unit 14 according to a preset sequence, as is better disclosed now in the following, also by referring to FIGS. 7–18.

The first step of the operation of composite moulding comprises submitting a first portion of the rigid plastic material 2 to the preforming operation. For that purpose, the material 2, in ribbon shape, is caused to advance by one step, and, if so necessary, is preheated under the preheater 16 positioned in its operating position for a preset time, after which the preheater mean is retracted back to its rest position.

Figure 7:
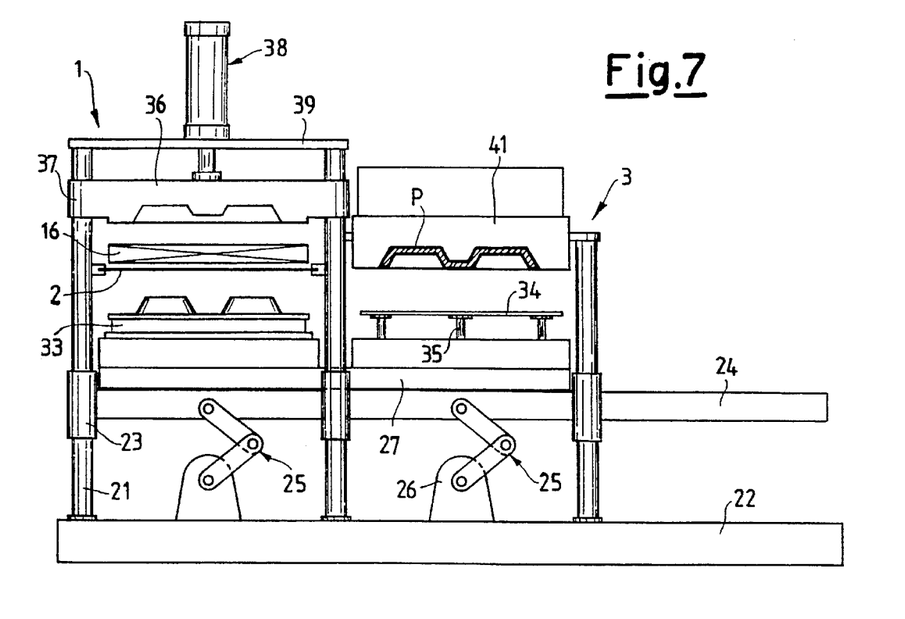
FIGS. 7–18 schematically illustrate the successive operating steps necessary in order to obtain an article of composite plastic material with coupled sheets of opposite faces, by means of the process and machine according to the present invention.

FIG. 7 schematically illustrates the situation a few time before the preforming operation.

Figure 8:
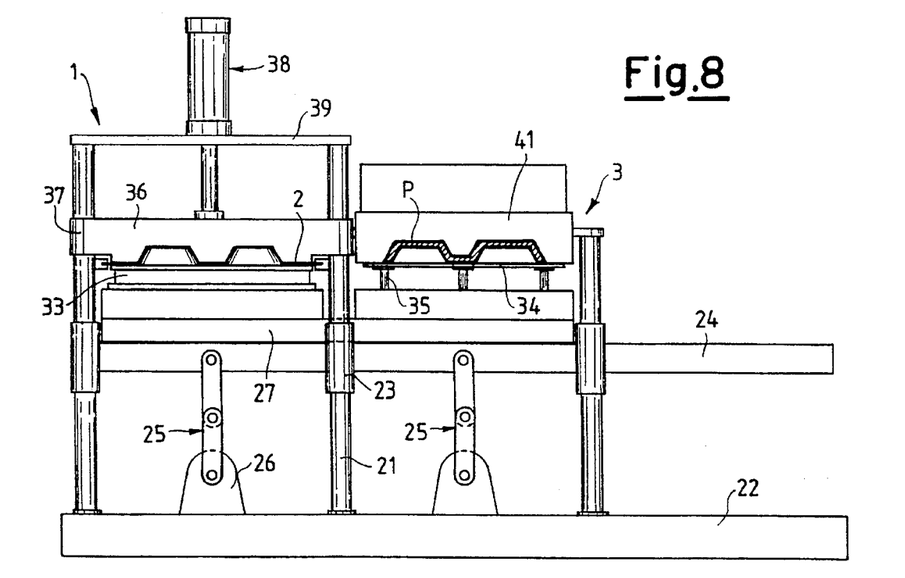

During the next step, the material 2 reaches its preforming position inside the preforming mould 1. By the central control unit 14, the motor means 26 and the hydraulic device 38 are actuated simultaneously, and both half-moulds 33 and 36 are brought to a position which is substantially aligned with the plane of the material 2 (FIG. 8). The latter is deformed according to the hollow of the half-mould 33, thanks to the depressure created inside the latter, through the channels 33a, and simultaneously, the preformed portion 2a is shorn off from the ribbon of material 2 along a perimetrical line, by the blades 40 (FIG. 5a). The scrap 12 remains as a continuous piece and during the successive steps of material 2 feed is wound on the roller 11 and can be advantageously recycled, by means of suitable treatments.

While the preforming is taking place, inside the moulding mould 3 the moulded article P previously finished is present, retained inside the upper half-mould 41.

Figure 9:
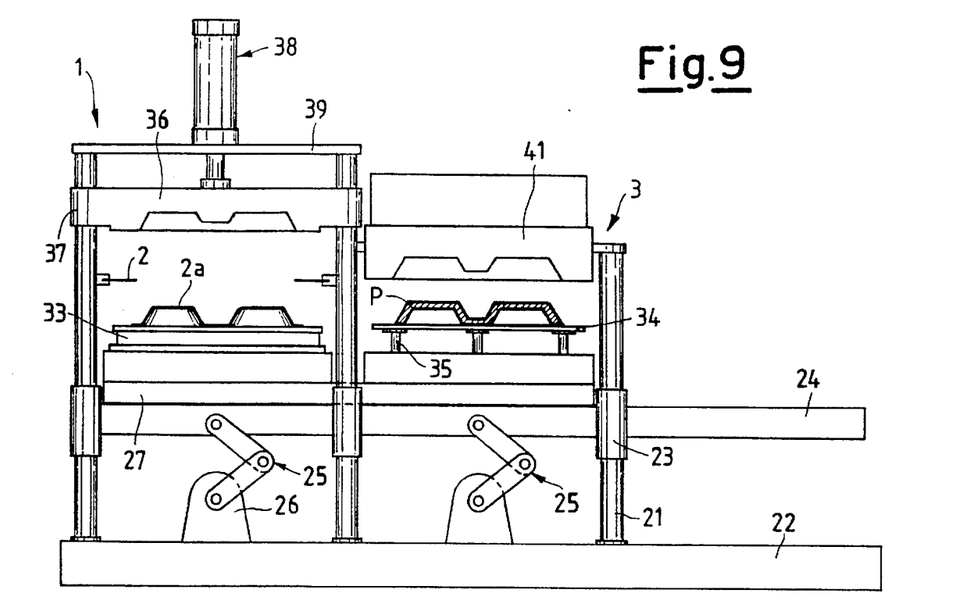

When the step of rigid material 2 preforming has taken place, by the central control unit 14 the command of moving the half-moulds 33 and 36 apart from each other is sent, and the knockouts are actuated simultaneously, in order to expel the finished article P from the half-mould 41. When the slide 27 is subsequently lowered down, the preformed portion 2a is retained on the half-mould 33, whereas the piece P is released from the counter-mould 41 and remains on the support plane 34 (FIG. 9).

Figure 10:
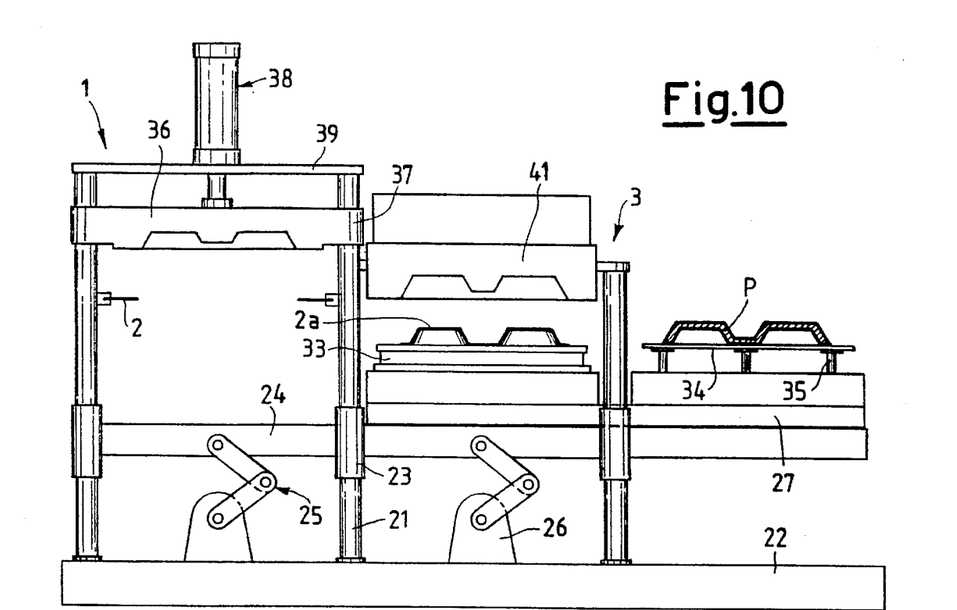

When the slide 27 reaches its lowermost position, the motor means 28 is enabled, still by the central control unit 14, which causes the slide 27 to be moved to the right in FIGS. 7–18, bringing the half-mould 33, with the preformed piece inside it, under the half-mould and the support plane 34 at the discharge station (FIG. 10).

Figure 11:
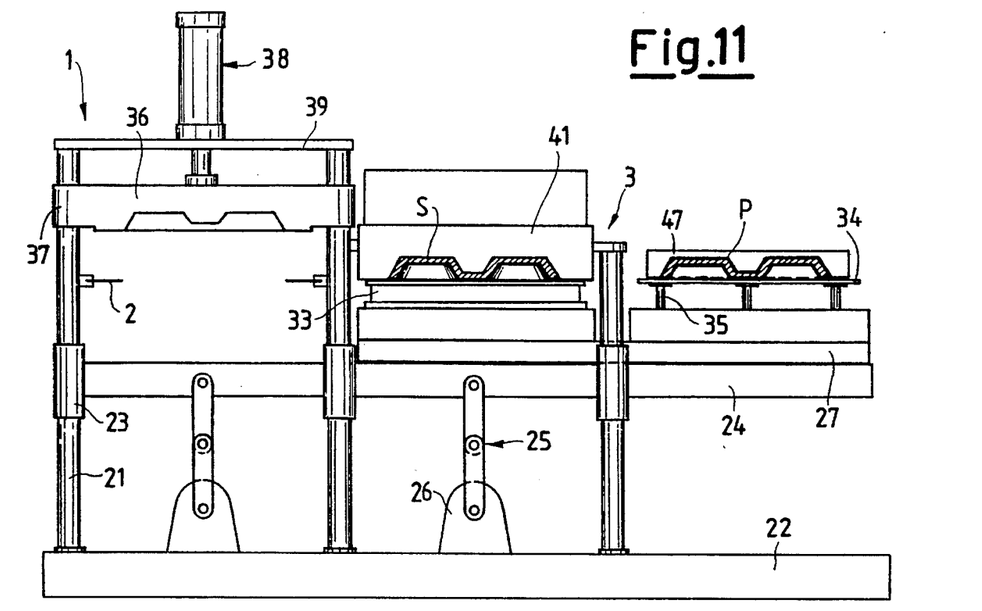
Figure 12:
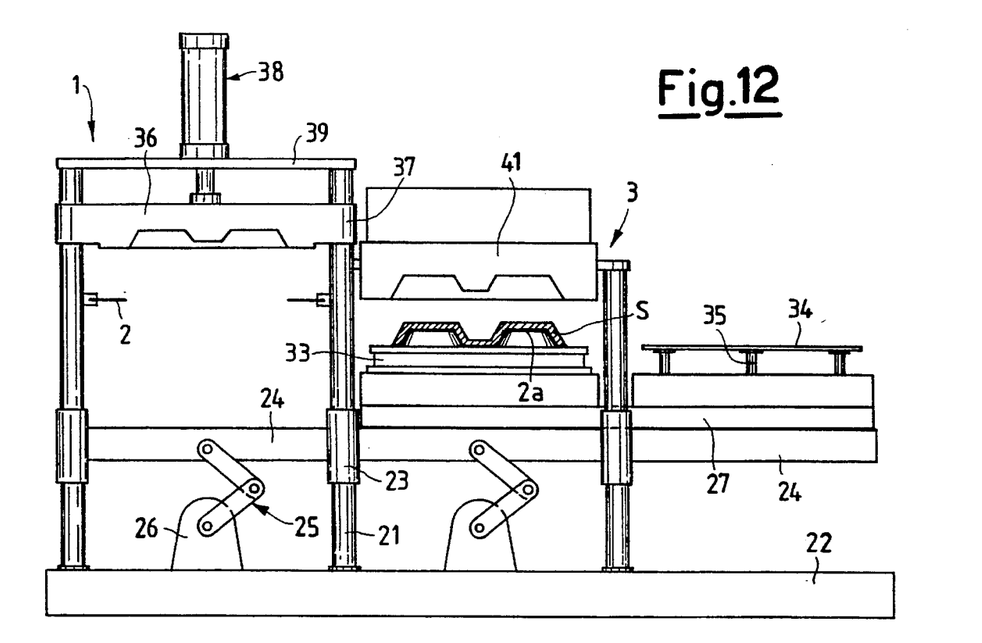
Figure 13:
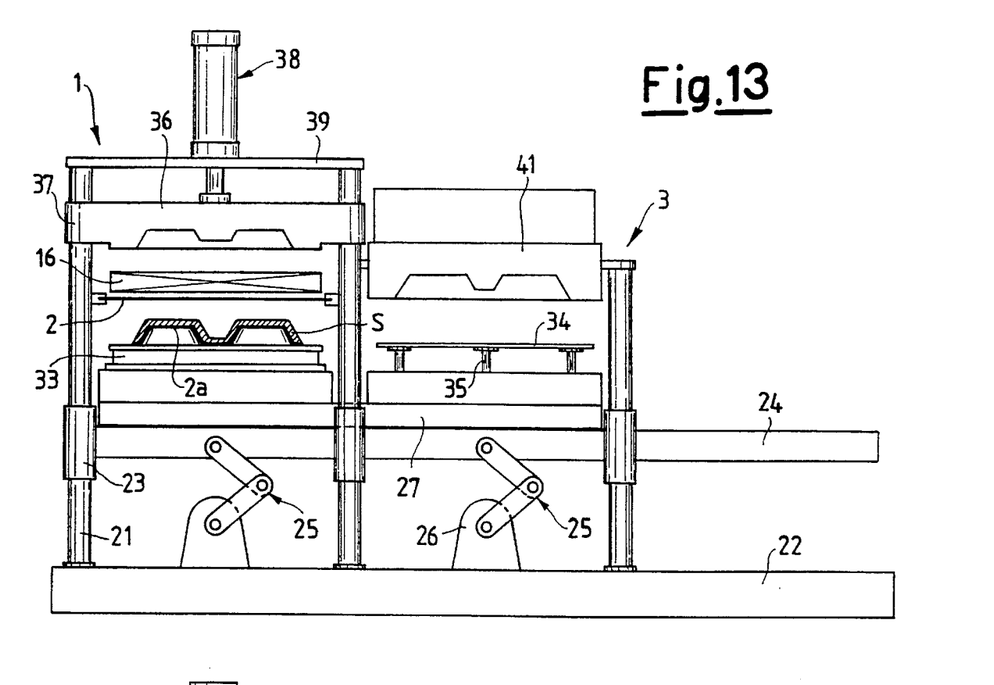

Now, the central control unit sends the command which causes the slide 27 to be moved upwards, and the half-moulds 33 and 41 come into mutual contact, in order to define the moulding hollow for the foamed plastic material according to the already known technique, which moulding is carried out by injecting the material from the feed channels 42 into the moulding hollow, then sending steam according to a pulsed feed pattern into the half-mould 41 in order to cause the material to undergo sintering, and it to be simultaneously coupled with the preformed rigid material 2a, with the pusher 47 being simultaneously actuated in order to push the already ready piece P onto the discharge conveyor belt 49 (FIG. 11).

When the moulding step is complete, the slider 27 is caused to move downwards and the opening of mould 3 as well as the de-moulding of just moulded piece S take place, in such a way that said piece S remains then retained by the lower half-mould 33, for example, by means of a depressure (FIG. 12), Retaining the piece S inside the lower mould 33 may advantageously serve to complete the cooling operations, while the half-mould 33 is being moved back to its preforming position (FIG. 13) where the application of the rigid material also on that face of piece S which is opposite to the face on which the rigid sheet 2a is already applied, takes place. In the meanwhile, the ribbon material 2 has also been caused to advance by one step.

Figure 14:
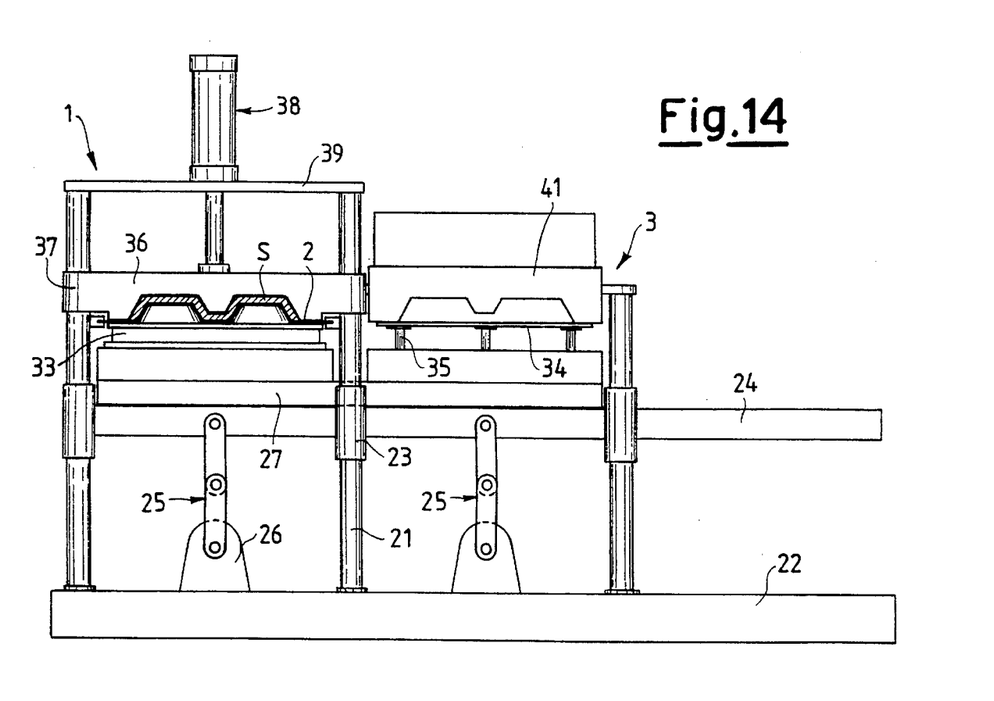
Figure 15:
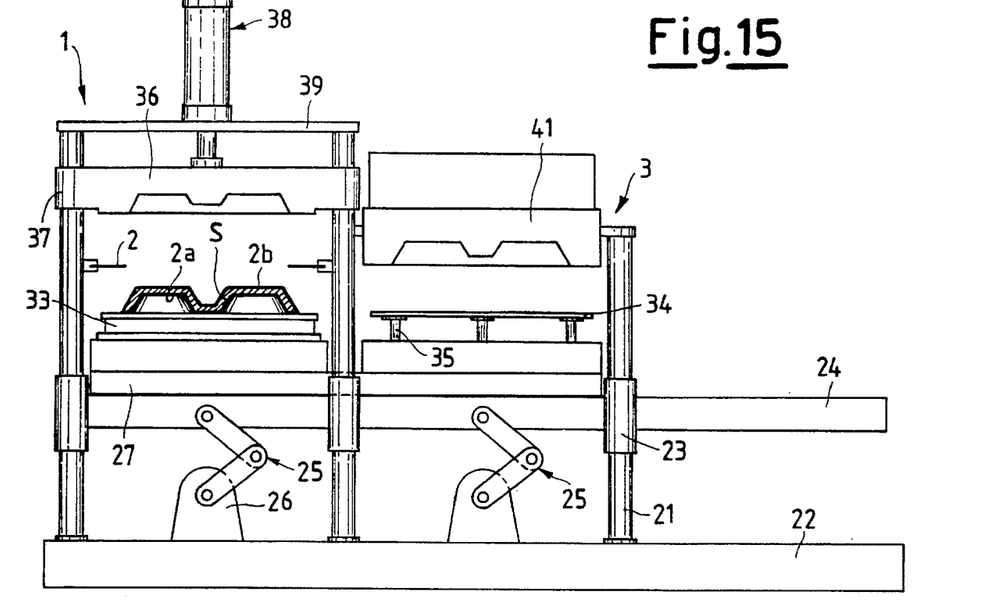

Then, the slide 27 is caused to move upwards and the counter-mould 36 is caused to move downwards and the preforming of a sheet of rigid material 2 on the foamed material is carried out, by bringing both half-moulds 33 and 36 substantially into contact with each other (FIG. 14). The configuration of the hollows provided in both half-moulds 33 and 36 makes it possible the new sheet of rigid material 2 to be perfectly preformed, with the material being simultaneously perimetrically shorn (FIG. 5c). The counter-mould 36 anyway is not essential, only the presence of the shearing means 40 being essential. In the case of absence of counter-mould 36, the presence of the already moulded foamed material does not make it possible the material 2 to perfectly adhere to all the moulded foamed material, but anyway makes it possible a preforming to be carried out which causes the material 2 to be given a shape which is close to the shape of the upper side of the piece S, thanks to a depressure produced through the perimetrical channels 33a provided in the half-mould 33 (FIG. 5b). The material 2 is always perimetrically shorn by the blades 40. Of course, the material 2 may be preheated.

Figure 16:
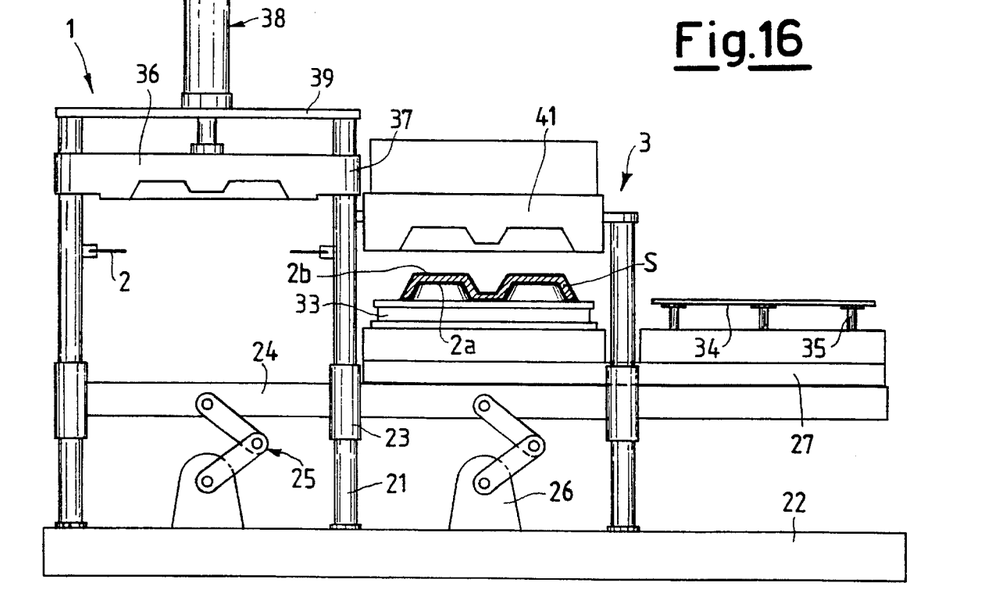
Figure 17:
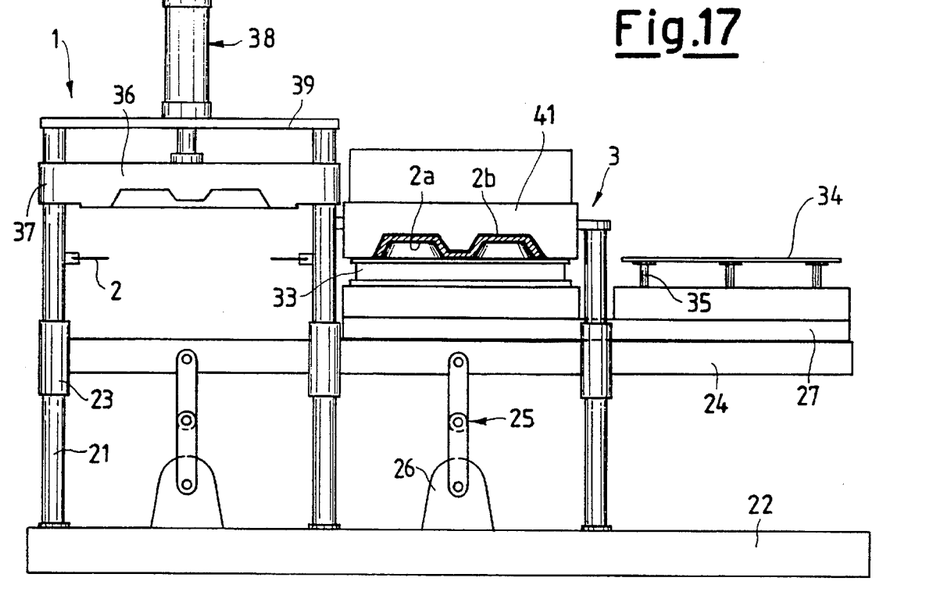

The piece S with the preformed sheet 2b is now retained on the bottom half-mould 33 (FIG. 15), and is then brought back to the moulding station 3 (FIG. 16). The moulding mould is now closed (FIG. 17) and steam is injected into it, on sheet 2b side. So, the high-temperature coupling of the sheet 2b on the foamed material is accomplished throughout the upper and perimetrical surface of the foamed material, because the hollow of the half-mould 41 corresponds to the shape of the upper and perimetrical surface of the foamed material previously moulded, and thanks to a certain elasticity of the foamed material, and to the limited thickness of the sheet 2b, the perfect adhesion is obtained at all points.

Steam temperature may be, for example, of 110° C., and the step of steam injection for the perfect adhesion of both materials may last some seconds. Before re-opening the mould 3, providing a cooling step may prove suitable.

Figure 18:
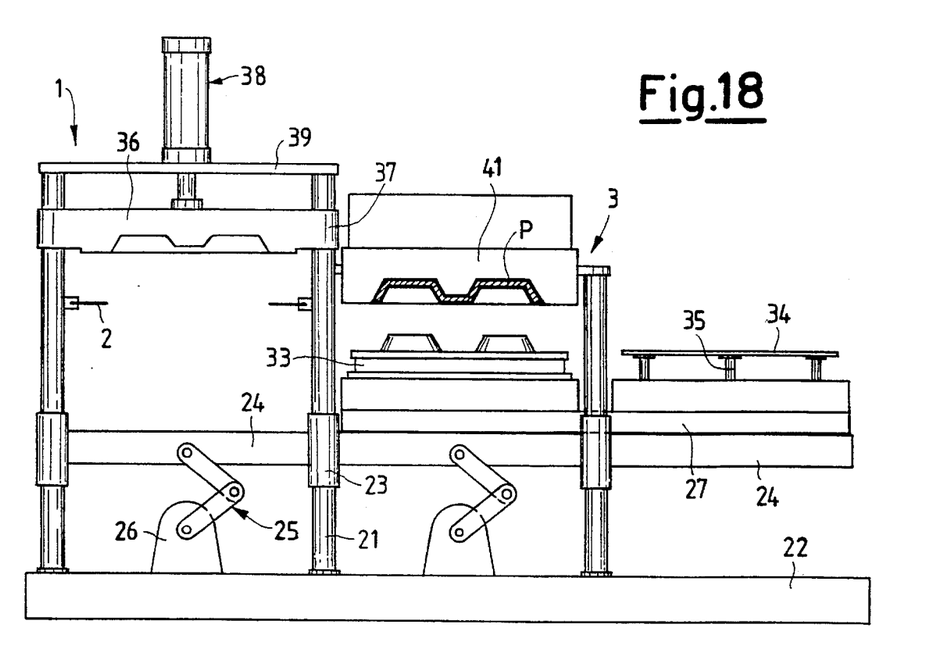

Now, the moulding mould 3 is opened by causing the slide 27 to move downwards together with the half-mould 33, with the finished piece P being anyway retained inside the upper half-mould 41, for example, by means of a depressure (FIG. 18). During this step, the cooling can be completed, or, should said cooling not have been already done while the mould is still closed, said cooling can be carried out now.

The slide 27 is now returned back to its position for successive piece preforming. In the meanwhile, also the ribbon of rigid material 2 has been caused to progress by one step.

One will understand that the machine is by now in position, ready for a further preforming and moulding operation, and the above disclosed cycle can be repeated.

Advantageously, in order to obtain an article provided with hardened and smooth opposite surfaces, one single half-mould is used, which can be translated to be coupled with a moulding half-mould (and, possibly, with a preforming half-mould), and the moulding takes place of the first portion of rigid material separated from the feed ribbon, whilst the second portion, also separated from the feed ribbon, is applied at a high temperature on the already moulded material, with a perfect and Long-lasting adhesion being obtained.

The residual material is in no way submitted to transformations or actions which may deteriorate it and render it no longer re-useable or re-cyclable. Turning the piece upside-down is no longer necessary in order to apply two sheets of rigid material on opposite surfaces thereof. The particular arrangement of the moulds, as regards the feed and discharge operations, makes the machine a particularly rational, small-overall-dimension, one. It should be observed that the same results could be also obtained without the half-mould 36, with the machine being hence furthermore simplified. Inasmuch as the preformed material is always brought to the moulding station on the same preforming half-mould, no additional means are required in order to transfer the material between the preforming and moulding stations, and in order to recover the scrap material, the moving means for fed material are enough. The process and machine according to the present invention make it furthermore possible composite materials to be moulded in which the rigid material may also be of a very small thickness.

The machine is also suitable for the simultaneous moulding of a plurality of distinct pieces, or can be easily adapted for that purpose.

Of course, modifications also and variants are possible besides those as said hereinabove. So, for example, lifting the slide 27 could be obtained by hydraulic way. The pusher 47 could be actuated slightly before the moulding step (by arranging the pusher 47 and the conveyor belt 49 at the level of the slide 27 in its lowered position). The feed of rigid material 2 and/or the discharge of finished pieces P might also take place on line with moulds 1 and 3. Moving the 27 could also be obtained by means of a pinion-slide rack system. It might also be possible the position of half-moulds 33, 36 and 41 to be inverted, in the sense that the horizontally translatable half-mould might be arranged above the other two half-moulds.

I claim:

1. A machine for molding a composite product in the form of a foamed plastic material sandwiched between first and second layers of rigid plastic material, the machine including a preforming station for molding the rigid material and a molding station for molding the foamed material to the rigid material, first feed means for delivering rigid material to the preforming station, second feed means for delivering foamed material to the molding station and steam supply means for supplying steam to the molding station, the preforming station including a counter-mold and the molding station including a molding half mold, a movable preforming half mold engagable with the counter mold in the preforming station to define a preforming mold and engagable with the molding half mold in the molding station to define a molding mold, positioning means for the preforming half mold for moving the preforming half mold between the preforming station and the molding station and control means for the positioning means for engaging the preforming half mold with the counter mold in the preforming station to mold a first layer of rigid plastic material in the preforming mold, for moving the preforming half mold to the molding station and engaging same with the molding half mold for molding the foamed material to the first layer of rigid material in the molding mold and for moving the preforming half mold back to the preforming station to re-engage the counter mold for molding a second layer of rigid plastic material over the foamed material in the preforming mold.

2. A machine according to claim 1 wherein the preforming half mold includes depressure means for applying a depressure thereto in the preforming station for molding the first layer of rigid material.

3. A machine according to claim 2 wherein the depressure means comprises plural channels in the preforming half mold.

4. A machine according to claim 1 wherein the positioning means includes a slide carrying the preforming half mold, reciprocable drive means for the slide for reciprocating the slide between positions in which the preforming half mold is located respectively in the preforming station and in the molding station, and lifting and lowering means for the slide for moving the preforming half mold into and out of engagement with the counter mold and the molding half mold.

5. A machine according to claim 1 wherein the preforming station includes shearing means for shearing portions of the rigid material from a rigid sheet supplied by the first eyed means.

6. A machine according to claim 4 wherein the slide includes receiving means for the composite product, said receiving means being located in the molding station when the movable half mold is in the preforming station and being shifted to a discharge station when the movable half mold is in the molding station.

* * * * *